(12) United States Patent
Fu et al.

(10) Patent No.: US 10,516,341 B1
(45) Date of Patent: Dec. 24, 2019

(54) SYNCHRONOUS RECTIFIER GATE VOLTAGE BOOST METHOD AND SYSTEM

(71) Applicant: SEMICONDUCTOR COMPONENTS INDUSTRIES, LLC, Phoenix, AZ (US)

(72) Inventors: Jian Ming Fu, Zhubei (TW); Chou-Sheng Wang, Hsinchu (TW); Zhibo Tao, Palo Alto, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/223,288

(22) Filed: Dec. 18, 2018

(51) Int. Cl.
*H02M 3/335* (2006.01)
*H02M 1/08* (2006.01)

(52) U.S. Cl.
CPC ......... *H02M 3/33592* (2013.01); *H02M 1/08* (2013.01)

(58) Field of Classification Search
CPC ......... H02M 3/33507; H02M 3/33523; H02M 3/33569; H02M 3/33592; H02M 1/08; H02M 1/32; H02M 2001/0032; Y02B 70/1433
USPC ..... 363/21.01–21.18, 16, 17, 20, 72, 89, 95, 363/97, 127, 131, 132
See application file for complete search history.

(56) References Cited

U.S. PATENT DOCUMENTS

| | | | |
|---|---|---|---|
| 2005/0195015 A1 | 9/2005 | Goldman | |
| 2014/0268915 A1* | 9/2014 | Kong | H02M 3/33592 363/21.14 |
| 2015/0124494 A1* | 5/2015 | Malinin | H02M 3/33592 363/21.14 |
| 2015/0280573 A1* | 10/2015 | Gong | H02M 3/33523 363/21.14 |
| 2015/0280584 A1* | 10/2015 | Gong | H02M 3/33515 363/21.13 |
| 2018/0351468 A1* | 12/2018 | Greenwood | H02M 3/3353 |
| 2019/0097521 A1* | 3/2019 | Tao | H02M 1/32 |

OTHER PUBLICATIONS

Experiment #5—Gate Driver; Purdue University Course ECE 433—Power Electronics; Course material downloaded from Internet at https://engineering.purdue.edu/Courses/ECE433/exp5_5th~6thweek_.pdf; 8 pages.

* cited by examiner

*Primary Examiner* — Yemane Mehari
(74) *Attorney, Agent, or Firm* — Dickinson Wright PLLC; Mark E. Scott

(57) ABSTRACT

Synchronous rectifier gate voltage boost method and system. At least some of the example embodiments are methods of operating a power converter to create an output voltage, including storing energy in a field of a main transformer arranged for flyback operation, the storing during periods of time when a primary switch is conductive and current flows through a primary winding of the transformer; and then transferring energy from the field of the main transformer to the output voltage on a secondary side of the power converter; activating a secondary rectifier (SR) switch on the secondary side of the power converter during periods of time when the primary switch is non-conductive, the activating by: driving a gate of the SR switch without boost if the output voltage is above a first threshold; and driving the gate of the SR switch with boost if the output voltage is below the first threshold.

20 Claims, 6 Drawing Sheets

US 10,516,341 B1

SYNCHRONOUS RECTIFIER GATE VOLTAGE BOOST METHOD AND SYSTEM

CROSS-REFERENCE TO RELATED APPLICATIONS

Not Applicable.

BACKGROUND

Switching power converters convert an input voltage to an output voltage. In some cases, the output voltage is selectable based on the type and capabilities of the device coupled to the power converter (e.g., systems that implement Universal Serial Bus (USB) 3.0). When switching power converters implement a synchronous rectifier in the form of a field effect transistor (FET), low output voltage may make it difficult for the secondary-side controller to make the FET fully conductive.

BRIEF DESCRIPTION OF THE DRAWINGS

For a detailed description of example embodiments, reference will now be made to the accompanying drawings in which.

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

In relation to electrical devices, the terms "input" and "output" refer to electrical connections to the electrical devices, and shall not be read as verbs requiring action. For example, a controller may have a gate output and one or more sense inputs.

"Controller" shall mean individual circuit components, an application specific integrated circuit (ASIC), a microcontroller with controlling software, a digital signal processor (DSP), a processor with controlling software, a field programmable gate array (FPGA), or combinations thereof, configured to read inputs and drive outputs responsive to the inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various example embodiments implement gate voltage boost for synchronous rectifiers. More particularly, example embodiments are directed to power converters with secondary-side controllers that selectively implement a gate voltage boost for a synchronous rectifier (SR) field effect transistor (FET) on the secondary side of the power converter. More particularly still, example embodiments are directed to power converters and secondary-side controllers that drive a gate of the SR FET without boost if the output voltage of the power converter is above a first threshold, and drive the gate of the SR FET with boost if the output voltage is below the first threshold. The specification first turns to an example switching power converter to orient the reader.

Figure 1:
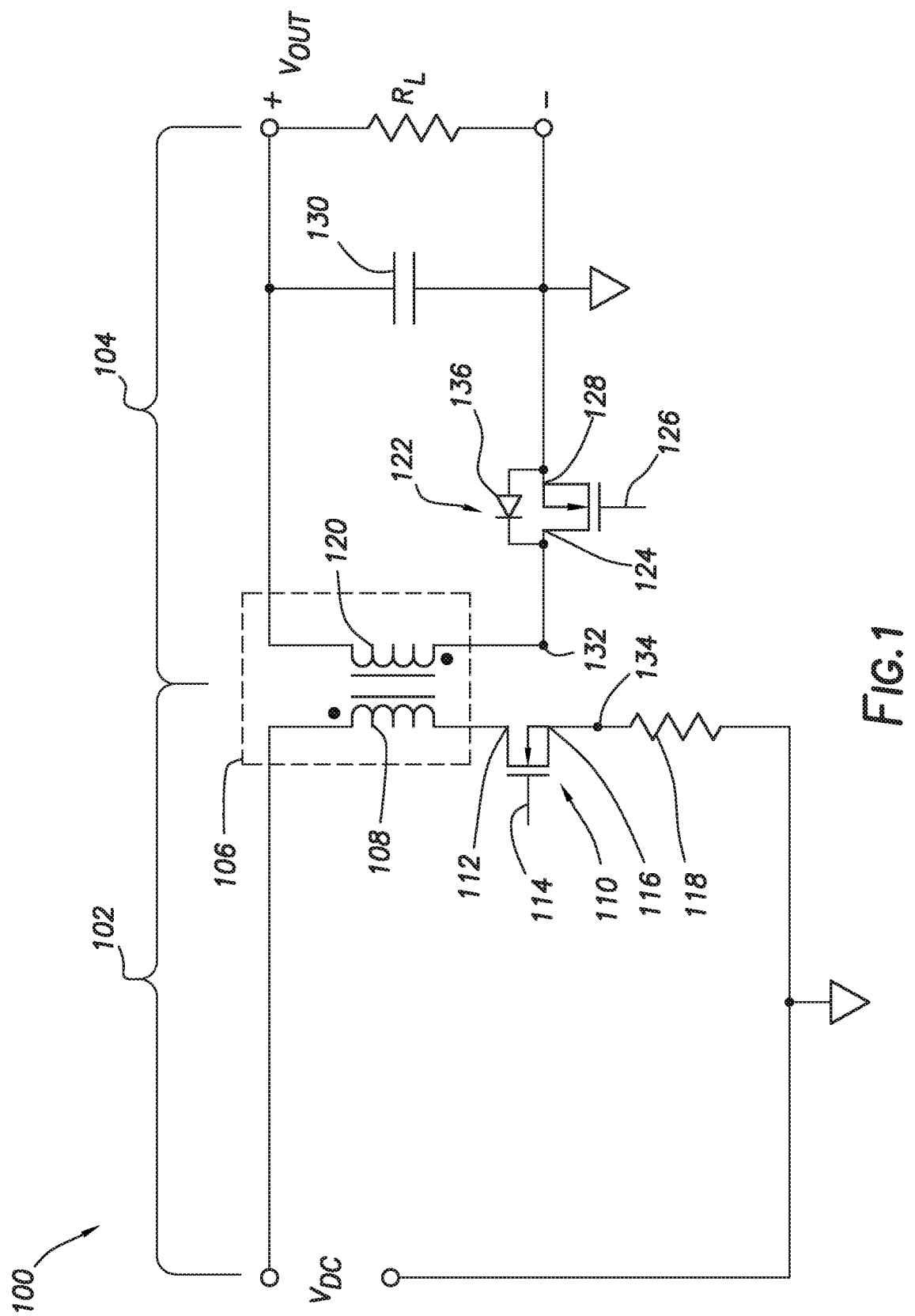
FIG. 1 shows a schematic diagram of a switching power converter in accordance with at least some embodiments.

FIG. 1 shows a schematic diagram of a switching power converter 100 (hereafter just "power converter 100") in accordance with at least some embodiments. In particular, the power converter 100 comprises a primary side 102 galvanically isolated from a secondary side 104 by way of a main transformer 106. A direct current (DC) input voltage $V_{DC}$ is supplied to the power converter 100. The power converter creates a DC output voltage $V_{OUT}$ provided to a load (the load illustratively shown as load resistor $R_L$). The primary side 102 comprises a primary winding 108 of the main transformer 106, with a first lead or connection of the primary winding 108 coupled to the positive side of the supply voltage $V_{DC}$. The second lead or connection of the primary winding 108 couples a main FET 110. In particular, the main FET 110 defines a drain 112, a gate 114, and a source 116. The drain 112 couples to the second connection of the primary winding 108. The source 116 couples to an example sense resistor 118, and the second side of the sense resistor 118 couples to ground. A current sense node 134 is defined between the source 116 and the resistor 118. The gate 114 couples to a primary-side controller (not shown in FIG. 1).

On the secondary side 104, the example power converter 100 comprises a secondary winding 120 of the main transformer 106. A first lead or connection of the secondary winding 120 couples to the positive terminal of the output voltage $V_{OUT}$, and the second lead or connection couples to a secondary or synchronous rectifier (SR) FET 122. The SR FET 122 defines a drain 124, a gate 126, and a source 128. The drain 124 couples to the second connection of the secondary winding 120, illustratively labeled as node 132. The source couples to ground or common on the secondary side 104. The gate couples to a secondary-side controller (not shown in FIG. 1). The SR FET 122 may include a body diode 136 between the drain 124 and the source 128. The secondary side 104 further comprises smoothing capacitor 130 coupled between the positive terminal of the output voltage $V_{OUT}$ and the negative terminal of the output voltage $V_{OUT}$ (i.e., ground or common on the secondary side 104).

The example power converter 100 works by transferring energy across the main transformer 106 by making the main FET 110 conductive and then non-conductive. That is, when the main FET 110 is conductive, electrical current flows from the voltage source $V_{DC}$, through the primary winding 108, through the main FET 110, and through the sense resistor 118 to ground. When the main FET 110 is conductive, the power converter 100 is storing charge in the field of the main transformer 106. Once the current flow reaches a predetermined value (hereafter "peak current"), the main FET 110 is made non-conductive. Additional clamping circuits may be implemented on the primary side 102, but are not shown so as not to unduly complicate the figure.

During periods of time when the main FET 110 is conducting a voltage is induced on the secondary winding 120 with a polarity as shown by the dot convention in FIG. 1. The polarity tends to reverse bias body diode 136 of SR FET 122. During periods of time when the main FET 110 is conducting the SR FET 122 in a non-conductive state, and no current flows through the secondary winding 120. Thus, energy is stored in the field of the main transformer 106 during periods of time when the main FET 110 is conducting. Once the main FET 110 is made non-conductive, the voltage induced on the secondary winding reverses, the secondary FET 122 is made conductive, and the collapsing field produces current flow through the secondary winding 120 that supplies the load $R_L$ and stores charge in the capacitor 130. That is, once the main FET 110 is made non-conductive the energy is transferred from the field of the main transformer 106 to the output voltage $V_{OUT}$. Thus, the example power converter 100 shown is arranged for flyback operation.

Figure 2:
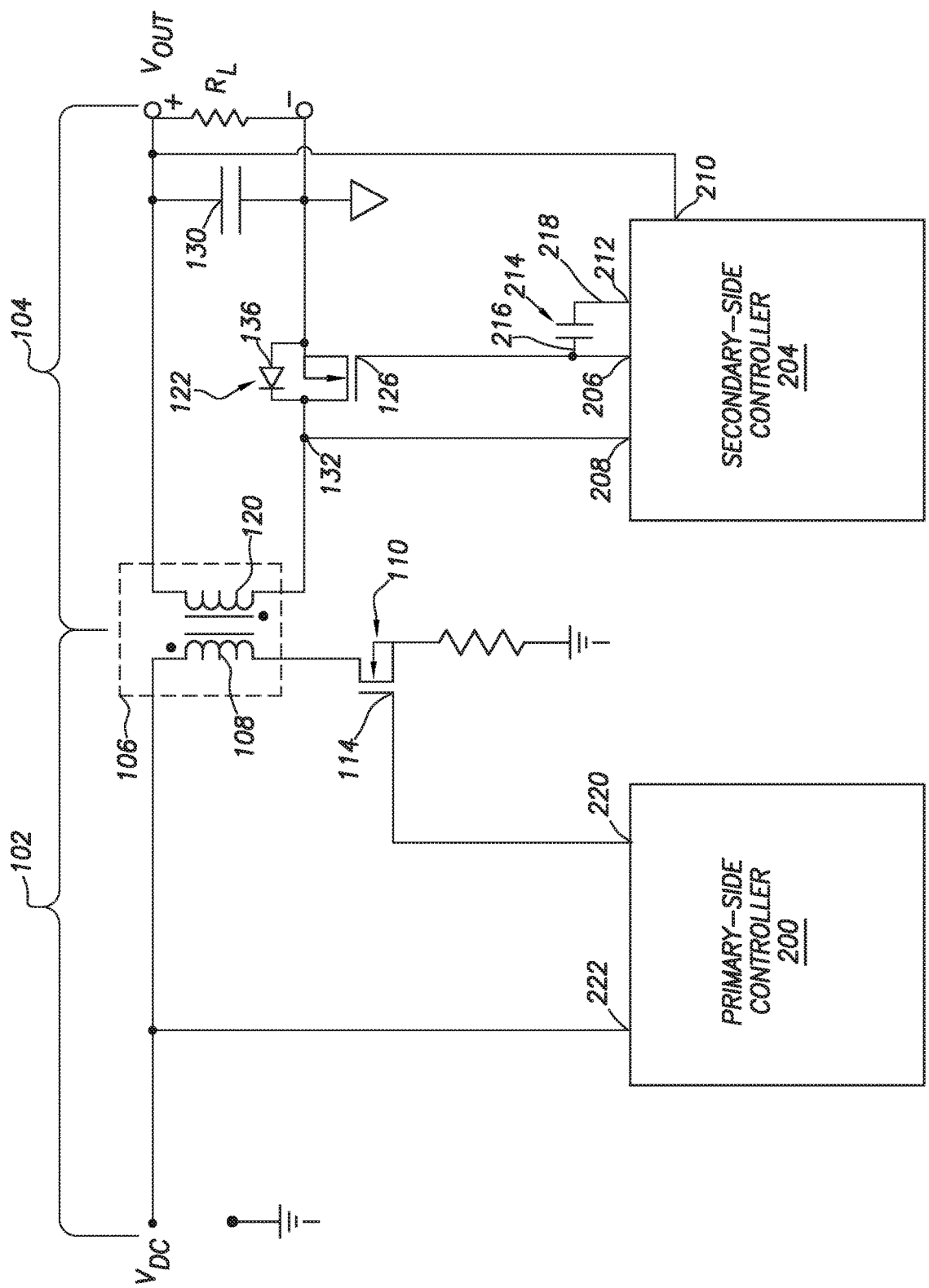
FIG. 2 shows a schematic diagram of a switching power converter in accordance with at least some embodiments.

FIG. 2 shows a power converter in accordance with at least some embodiments. In particular, FIG. 2 shows all the components of power converter 100 as shown in FIG. 1, and further includes a primary-side controller 200 and a secondary-side controller 204. The primary-side controller 200 defines a gate output 220 and a voltage sense input 222. Additional terminals would also be present (e.g., ground terminal, voltage feedback terminal), but those additional terminals are not shown so as not to unduly complicate the figure. The gate output 220 is coupled to the gate 114 of the main FET 110. The voltage sense input 222 is coupled to the input voltage $V_{DC}$.

The secondary-side controller 204 defines a gate terminal 206, a winding sense terminal 208, a voltage sense terminal 210, and a capacitance terminal 212. Additional terminals would also be present (e.g., ground terminal, power terminal), but those additional terminals are not shown so as not to unduly complicate the figure. In the example system, a boost capacitor 214 couples between the gate terminal 206 and the capacitance terminal 212. More particularly, the boost capacitor 214 defines a first lead 216 coupled to the gate terminal 206, and a second lead 218 coupled to the capacitance terminal 212. The gate terminal 206 couples to the gate of the SR FET 122. The secondary-side controller 204 makes the SR FET 122 conductive and non-conductive by appropriately driving a gate signal to the gate 126 of the SR FET 122. The winding sense terminal 208 couples to the node 132. The voltage sense terminal 210 couples to the output voltage $V_{OUT}$. As shown, the secondary-side controller 204 is directly coupled to the output voltage $V_{OUT}$ for sensing purposes, but coupling through a voltage divider circuit to reduce the voltage (if needed) is also contemplated. The discussion now turns to a more detailed description of operation of the secondary side 104 of the power converter 100.

Still referring to FIG. 2, the primary side 102 stores energy in the field of the main transformer 106 by making the main FET 110 conductive as discussed above. During periods of time when energy is being stored in the field, the SR FET 122 is non-conductive, and the voltage on the secondary winding 120 reverse biases the body diode 136 of the SR FET 122. Thus, no current flows in the secondary winding 120 during energy storage mode. The secondary-side controller senses that the SR FET 122 is reversed biased by sensing the voltage at the node 132 using the winding sense terminal 208. The secondary-side controller 204 does not make the SR FET 122 conductive when the SR FET 122 is reversed biased.

However, once the main FET 110 is made non-conductive, the polarity of the voltage on the secondary winding 110 reverses, which forward biases the body diode 136, and thus current may flow from the secondary winding 120 to the output voltage $V_{OUT}$. In some cases, the secondary-side controller 204 waits until current starts to flow in the body diode 136 before making the SR FET 122 conductive. For example, the secondary-side controller 204 may sense a polarity reversal at the node 132, and then sense that the node voltage settles at a value of a diode voltage drop, before driving the gate 126 of the SR FET 122 to make the SR FET 122 conductive. In other cases, the secondary-side controller 204 may proactively drive the gate 126 of the SR FET 122 just as the polarity reversal takes place (e.g., attempt to implement zero-volt switching of the SR FET 122).

In accordance with example embodiments, the secondary-side controller 204 may drive the gate 126 of the SR FET 122 without or without boost, depending on whether the output voltage $V_{OUT}$ (as sensed by the voltage sense terminal 210) is above or below a predetermined threshold. In example cases, when the output voltage $V_{OUT}$ is at or above the predetermined threshold (e.g., 5 Volts), the secondary controller 204 drives the gate 126 of the SR FET 122 without boost. That is, in example systems when the output voltage $V_{OUT}$ is above the predetermined threshold, the secondary-side controller 204 can develop sufficient gate voltage to drive the SR FET 122 to saturation. By contrast, when the output voltage $V_{OUT}$ is below the predetermined threshold (e.g., between 5 and 3.3 Volts, or at 3.3 Volts), the secondary-side controller 204 may be unable to drive the gate 126 of the SR FET 122 to saturation. Thus, when the output voltage $V_{OUT}$ is below the predetermined threshold the secondary-side controller 204 drives the gate of the SR FET 122 with boost.

Figure 3:
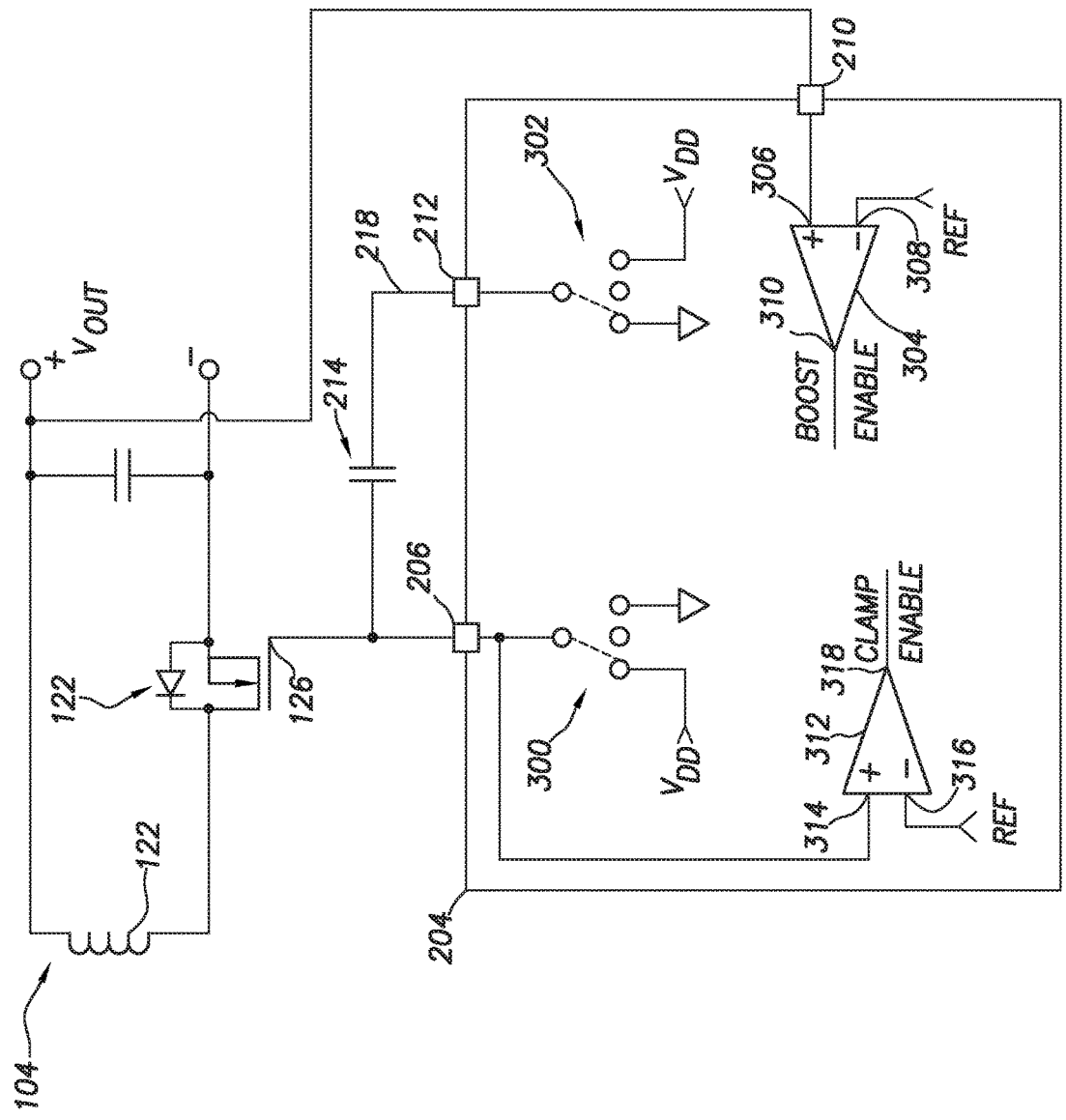
FIG. 3 shows a conceptual circuit diagram in accordance with at least some embodiments.

FIG. 3 shows a conceptual circuit diagram in accordance with at least some embodiments. In particular, FIG. 3 shows the secondary side 104 along with the secondary-side controller 204. The second-side controller 204 is shown to have the gate terminal 206, the capacitance terminal 212, and the voltage sense terminal 210, all connected as discussed with respect to FIG. 2. Internally, the example secondary-side controller 204 shows two conceptual switches 300 and 302, each conceptual switch being a single pole, triple-throw switch. It is noted that the secondary-side controller 204 does not implement mechanical switches as shown; rather, the switches 300 and 302 are presented as tools to help explain operation of the example secondary-side controller 204 in relation to driving the gate 126 of the SR FET 122 with and without boost.

Conceptual switch 300 couples to the gate terminal 206, and has three example positions. The first position couples the gate terminal 206 to the internal supply voltage $V_{DD}$. The middle or second position is unconnected, and thus when the switch 300 is in the second position the gate terminal 206 is electrically floated. The third position couples the gate terminal 206 to ground. Similarly for example switch 302, example switch 302 couples to the capacitance terminal 212, and has three example positions. The first position couples the capacitance terminal 212 to the internal supply voltage $V_{DD}$. The middle or second position is unconnected, and thus when the switch 302 is in the second position the capacitance terminal 212 is electrically floated. The third position couples the capacitance terminal 212 to ground. The conceptual switches 300 and 302 take the various positions depending on the state of the SR FET 122 and the output voltage $V_{OUT}$, as discussed more below. Finally, in the example of FIG. 3 the secondary-side controller 204 has a boost comparator 304 defining a first input 306, a second input 308, and a boost enable output 310. The first input 306 is coupled to the voltage sense terminal 210, and the second input 308 is coupled to a reference voltage. The boost enable output 310 is shown un-coupled in the conceptual circuit diagram of FIG. 3, but will be discussed more below.

In the example system, the boost comparator 304 compares the output voltage $V_{OUT}$ as sensed through the voltage sense terminal 210 to the reference voltage (e.g., 5 Volts). When the output voltage $V_{OUT}$ is at or above the reference voltage, the boost enable output 310 is de-asserted. When the output voltage $V_{OUT}$ is below the reference voltage, the boost enable output 310 is asserted.

Consider first the situation where the output voltage $V_{OUT}$ is above the reference voltage. In this mode, the secondary-side controller 204 drives the gate 126 of the SR FET 122 without boost. For example, during periods of time when the primary side 102 (FIG. 1) is storing charge in the field of the main transformer 106 (FIG. 1), the conceptual switch 300 grounds gate terminal 206 and thus the gate 126 of the SR FET 122, and the conceptual switch 302 either grounds the capacitance terminal 212 or floats the capacitance terminal 212. When the storing of energy is complete and transferring of energy from the field begins, the SR FET 122 is made conductive by conceptual switch 300 coupling the internal supply voltage $V_{DD}$ to the gate terminal 206 and thus the gate 126 of the SR FET 122, and once the field fully collapses the SR FET 122 is made non-conductive by conceptual switch 300 coupling the gate terminal 206 to ground again. Because the output voltage $V_{OUT}$ is above the reference voltage in this example, and the boost enable output 310 is de-asserted, the conceptual switch 302 leaves the capacitance terminal 212 either grounded or electrically floated during the entire cycle of making SR FET 122 conductive and then non-conductive. In either event the capacitor 214 does not contribute to the voltage driven to the gate 126. That is, when the boost enable output 310 is de-asserted, the gate 126 of the SR FET 122 is driven without boost.

Now consider a situation where the output voltage $V_{OUT}$ is below the reference voltage (e.g., the output voltage $V_{OUT}$ is 3.3 Volts). In this mode, the secondary-side controller 204 drives the gate 126 of the SR FET 122 with boost. For example, during periods of time when the primary side 102 (FIG. 1) is storing charge in the field of the main transformer 106 (FIG. 1), the conceptual switch 300 grounds gate terminal 206 and thus the gate 126 of the SR FET 122, and the conceptual switch 302 grounds the capacitance terminal 212. When the storing of energy is complete and the transferring energy from the field begins, the SR FET 122 is made conductive initially by conceptual switch 300 coupling the internal supply voltage $V_{DD}$ to the gate terminal 206 and thus the gate 126 of the SR FET 122. Coupling the internal supply voltage $V_{DD}$ not only drives the gate 126 voltage high, but also charges the capacitor 214. After a certain amount of time that can be either predetermined or measured, the voltage on the gate terminal 206 and thus the voltage across the capacitor 214 reaches or asymptotically approaches the internal supply voltage $V_{DD}$. Simultaneously, the conceptual switch 300 floats the gate terminal 206 by moving to the example middle position, and the conceptual switch 302 couples the capacitance terminal 212 (and thus the second lead 218 of the capacitor 214) to the internal supply voltage $V_{DD}$. The voltage on the capacitor 214 has the ability to drive the voltage on the gate 126 as high as the sum of voltage on capacitor 214 and the internal supply voltage $V_{DD}$. The example system may remain with the gate terminal 206 floated and the capacitance terminal 212 coupled to the boost voltage during the entire time the SR FET 122 is conductive. When the secondary-side controller 204 determines the SR FET 122 should be non-conductive, the conceptual switch 300 grounds the gate terminal 206, and conceptual switch 302 grounds or floats the capacitance terminal 212, and the cycle may begin again after the next energy storage cycle.

In some cases, the voltage to which the gate 126 can be driven when the capacitance terminal 212 is coupled to the boost voltage may be greater than the breakdown voltage of the gate 126 of the SR FET 122. Thus, in some cases the example system clamps the gate voltage at a predefined clamp voltage. More particularly, the example system comprises a clamp comparator 312 defining a first input 314, a second input 316, and a clamp enable output 318, the first input 314 is coupled to the gate terminal 206, and the second input 316 is coupled to a clamp reference voltage. The clamp enable output 318 is shown un-coupled in the conceptual circuit diagram of FIG. 3, but will be discussed more below. In embodiments that clamp the gate voltage, after the conceptual switch 300 floats the gate terminal 206 and the conceptual switch 302 couples the boost voltage to the capacitance terminal 212, the clamp comparator 312 compares the voltage on the gate terminal 206 (and thus the gate 126) to the predefined clamp voltage. When the voltage on the gate terminal 206 meets or exceeds the clamp reference voltage on the second input 316, the clamp enable output 318 is asserted. Responsive to assertion of the clamp enable output 318, the conceptual switch 302 floats the capacitance terminal 212, ceasing the driving of voltage to the gate 126 and thus clamping the gate 126 at the predefined clamp voltage (relying on parasitic capacitance of the gate 126).

Figure 4:
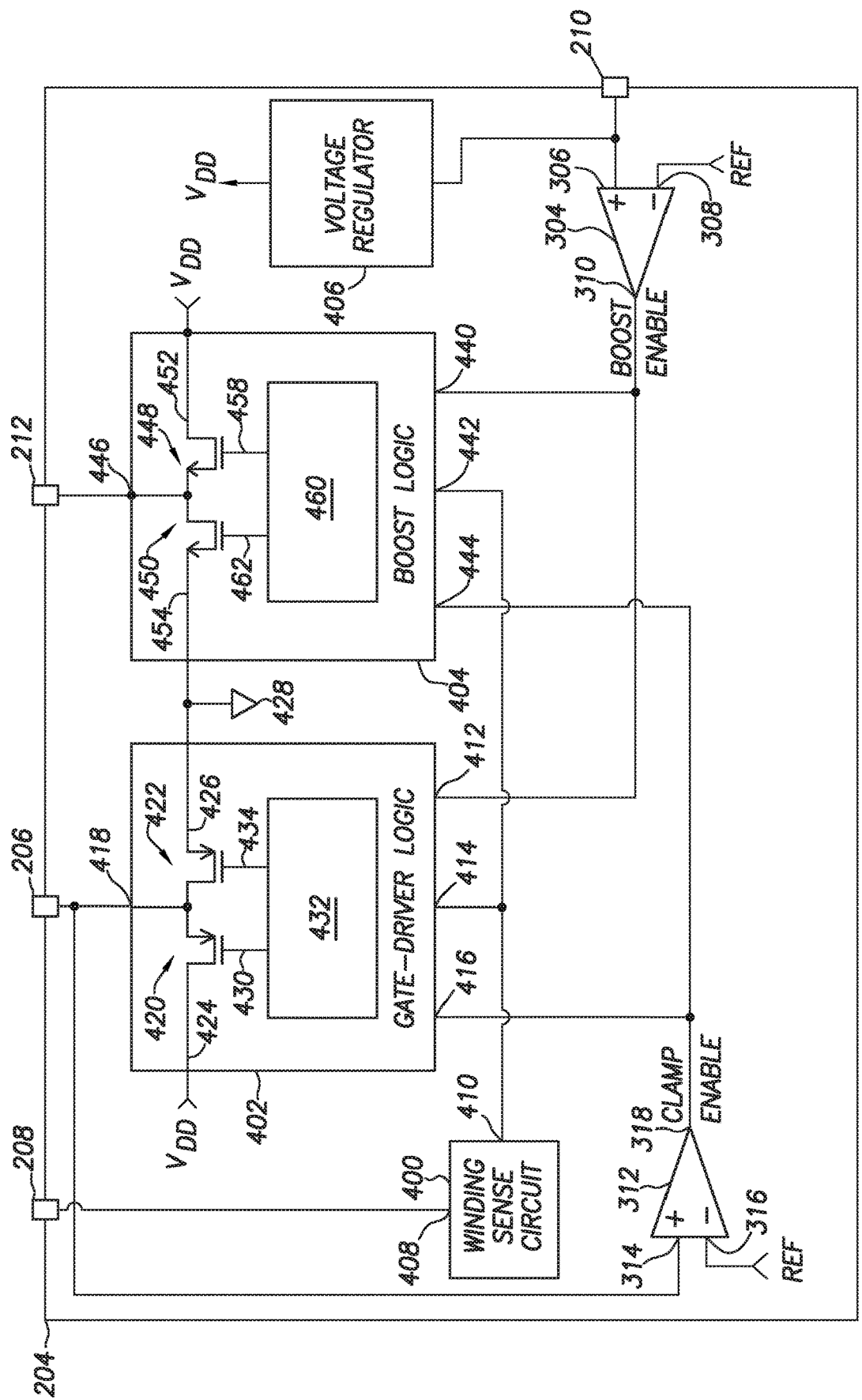
FIG. 4 shows an electrical block diagram of a secondary-side controller in accordance with at least some embodiments.

FIG. 4 shows an electrical block diagram of a secondary-side controller in accordance with at least some embodiments. In particular, the example secondary-side controller 204 of FIG. 4 shows the gate terminal 206, the winding sense terminal 208, the voltage sense terminal 210, and the capacitance terminal 212. Within the example secondary-side controller 204 is defined a winding sense circuit 400, a gate driver logic 402, a boost logic 404, and a voltage regulator 406. FIG. 4 further shows the clamp comparator 312 and the boost compactor 304 as discussed with respect to FIG. 3. The winding sense circuit 400 defines a sense input 408 and the gate output 410. The winding sense circuit 400 is designed and constructed to sense the voltage at the node 132 (FIG. 2), and assert the driver signal on the gate output during periods of time when the SR FET 122 (FIG. 3) is to be conductive. The voltage regulator 406 regulates the output voltage $V_{OUT}$ received on the voltage sense terminal (or a different terminal) to be the internal supply voltage $V_{DD}$. The voltage regulator 406 may take any suitable form, such as a linear regulator or a low drop out (LDO) regulator. In an example system, the internal supply voltage $V_{DD}$ is 5 Volts when the output voltage $V_{OUT}$ is 5

Volts or higher. When the output voltage $V_{OUT}$ is between 3.3 and 5 Volts, so too is the internal supply voltage $V_{DD}$.

The gate driver logic 402 defines a boost enable input 412, a gate input 414, a clamp input 416, and a gate output 418. The boost enable input 412 is coupled to the boost enable output 310 of the boost comparator 304. The gate input 414 is coupled to the driver signal on the gate output 410 of the winding sense circuit 400. The clamp input 416 is coupled to the clamp enable output 318 of the clamp comparator 312. The gate output 418 is coupled to the gate terminal 206. The gate driver logic 402 is designed and constructed to, during periods of time when the boost enable output 310 is de-asserted, drive the gate output 418 of the SR FET to match the gate input 414. The gate driver logic 402 is further designed and constructed to, during periods of time when the boost enable output 310 is asserted and the gate signal is asserted: drive a voltage to the gate output 418 responsive to assertion of the gate input 414; and then float the gate output 418 (and thus float the gate 126 (FIG. 3) of the SR FET 122 (FIG. 3).

In the example system, the gate driver logic 402 comprises a first FET 420 and a second FET 422 arranged in a push-pull configuration, with the gate output 418 coupled between the FETS 420 and 422. The drain 424 of FET 420 is coupled to the internal supply voltage $V_{DD}$, and the source 426 of FET 422 is coupled to ground 428. FET 420 further defines a gate 430 coupled to the driver 432, and FET 422 further defines a gate 434 coupled to the driver 432. The FETs 420 and 422 may thus implement the operation of the conceptual switch 300 (FIG. 3). That is, when the gate 430 of FET 420 is driven high and thus FET 420 is conductive, and when gate 434 of FET 422 is driven low and thus FET 422 is non-conductive, the internal supply voltage $V_{DD}$ is coupled to the gate terminal 206. Oppositely, when the gate 430 of FET 420 is driven low and thus FET 420 is non-conductive, and when gate 434 of FET 422 is driven high and thus FET 422 is conductive, the gate terminal 206 is coupled to ground. When the gate 430 of FET 420 is driven low and thus FET 420 is non-conductive, and when gate 434 of FET 422 is driven low and thus FET 422 is non-conductive, the gate terminal 206 is electrically floated.

The boost logic 404 defines a boost enable input 440, a gate input 442, a clamp input 444, and a boost output 446. The boost enable input 440 is coupled to the boost enable output 310 of the boost comparator 304. The gate input 442 is coupled to the driver signal on the gate output 410 of the winding sense circuit 400. The clamp input 444 is coupled to the clamp enable output 318 of the clamp comparator 312. The boost output 446 is coupled to the capacitance terminal 212. The boost logic 404 is designed and constructed to, during periods of time when the boost enable output 310 is de-asserted, ground or float the boost output 446 (and thus the capacitance terminal 212). The boost logic 404 is further designed and constructed to, during periods of time when the boost enable output 310 is asserted and the gate signal is asserted: ground boost output 446 responsive to assertion of the gate input 442; and when the gate 126 (FIG. 3) of the SR FET 122 (FIG. 3) is floated, drive a boost voltage (e.g., the internal supply voltage $V_{DD}$) to the boost output 446.

In the example system, the boost logic 404 comprises a first FET 448 and a second FET 450 arranged in a push-pull configuration, with the boost output 446 coupled between the FETS 448 and 450. The drain 452 of FET 448 is coupled to the internal supply voltage $V_{DD}$, and the source 454 of FET 450 is coupled to ground 428. FET 448 further defines a gate 458 coupled to the driver 460, and FET 450 further defines a gate 462 coupled to the driver 460. The FETs 448 and 450 may thus implement the operation of the conceptual switch 302 (FIG. 3). That is, when the gate 458 of FET 448 is driven high and thus FET 448 is conductive, and when gate 462 of FET 450 is driven low and thus FET 450 is non-conductive, the internal supply voltage $V_{DD}$ is coupled to the capacitance terminal 212. Oppositely, when the gate 458 of FET 448 is driven low and thus FET 448 is non-conductive, and when gate 462 of FET 450 is driven high and thus FET 450 is conductive, the capacitance terminal 212 is coupled to ground. When the gate 458 of FET 448 is driven low and thus FET 448 is non-conductive, and when gate 462 of FET 450 is driven low and thus FET 450 is non-conductive, the capacitance terminal 212 is electrically floated.

The example secondary-side controller 204 may also implement clamping of the gate voltage during the boost mode. That is, during the boost portion of the driving the gate of the SR FET, the gate terminal 206 is floated and the capacitance terminal 212 is coupled to the boost voltage (e.g., internal supply voltage $V_{DD}$). To implement clamping, the boost logic 404 is further designed and constructed to, during periods of time when the boost enable output 310 is asserted, float capacitance terminal 212 (e.g., the second lead of the capacitor) when the clamp enable output 318 goes asserted, indicating the gate voltage has reached the predefined clamp voltage.

Figure 5:
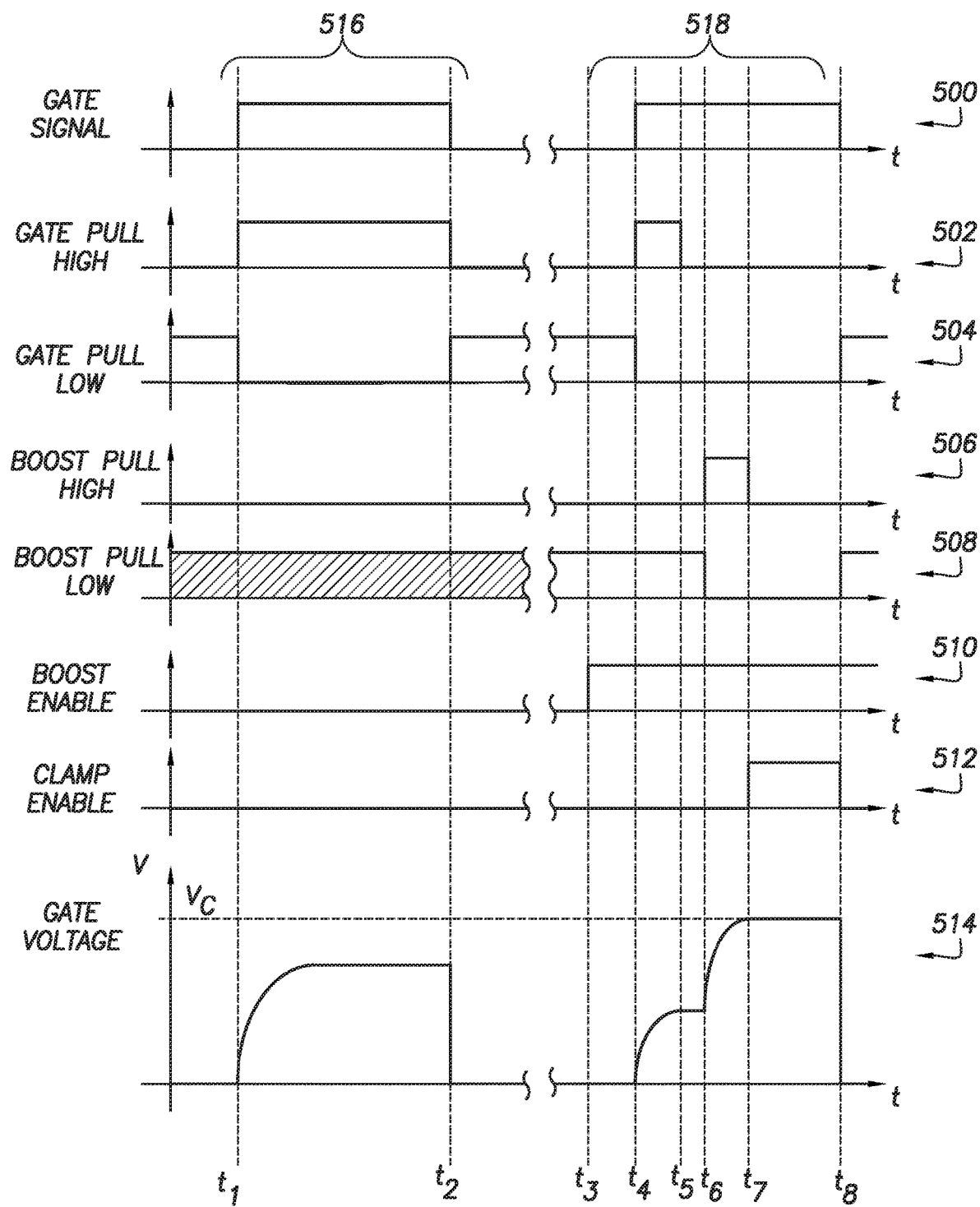
FIG. 5 shows a timing diagram in accordance with at least some embodiments.

FIG. 5 shows a timing diagram in accordance with at least some embodiments. In particular, FIG. 5 shows several signals plotted on corresponding time axis (with references back to FIG. 4), including: the internal gate signal 500 (on gate output 410 asserted high); gate pull high signal 502 (signal on gate 430 of FET 420); gate pull low signal 504 (signal on gate 434 of FET 422); boost pull high 506 (signal on gate 458 of FET 448); boost pull low 508 (signal on gate 462 of FET 450); boost enable 510 (signal on boost enable output 310 asserted high); clamp enable 512 (signal on clamp enable output 318 asserted high); and gate voltage 514 (voltage on gate terminal 206). The timing diagram of FIG. 5 shows a time frame 516 in which gate of the SR FET is driven without boost, and shows a time frame 518 in which the gate of the SR FET is driven with boost.

Turning first to the time frame 516 in which the gate of the SR FET is driven without boost. That is, in the example time frame 516 the output voltage VOUT is above the first threshold, and thus the boost enable signal 510 is de-asserted. In this state or condition, when the gate signal 500 is asserted at the time t1, the gate pull high signal 502 is driven high and simultaneously the gate pull low signal 504 is driven low. Thus, the FET 420 couples the internal supply voltage VDD to the gate terminal 206 (and the SR FET 122 (FIG. 3)) becomes conductive. Because the boost enable signal 510 is de-asserted during the time frame 516, the boost pull high signal 506 remains de-asserted at the transition of the gate signal 500 at time t1. Moreover, because the capacitance terminal 212 can be either electrically floated or grounded in the condition when no boost is used, the boost pull low signal 508 can be either be either high or low (i.e., a "don't care") as shown by the cross-hatching. It is assumed in FIG. 5 that the voltage driven to the gate terminal 206 remains below a voltage at which the clamp enable signal 512 would be asserted. Responsive to the internal supply voltage VDD being coupled to the gate terminal 206, the gate voltage signal 514 climbs until the gate voltage saturates. It is noted that the rise time of the gate voltage signal 514 is exaggerated for clarity. Finally, at time t2 the gate signal 500 goes de-asserted, and the correspondingly the gate pull high signal 502 is de-asserted and the gate pull low signal 504 is asserted, thus grounding the gate terminal 206 and making SR FET 122 non-conductive.

Turning now to the second time frame 518 in which the gate of the SR FET is driven with boost. In the example time frame 518 the output voltage $V_{OUT}$ falls below the first threshold at time t3, and thus the boost enable signal 510 is asserted at time t3. In anticipation of driving the gate of the SR FET with boost, in some embodiments when the boost enable signal 510 is asserted the "don't care" condition of the boost pull low signal 508 changes, and the boost pull low signal 508 is asserted (thus grounding the capacitance terminal 212). In this state or condition, when the gate signal 500 is again asserted at the time t4, the gate pull high signal 502 is driven high and simultaneously the gate pull low signal 504 is driven low. Thus, the FET 420 couples the internal supply voltage $V_{DD}$ to the gate terminal 206 (and the SR FET 122 (FIG. 3)) and the gate voltage 514 begins to rise. In accordance with example embodiments, however, because the boost enable signal 510 is asserted, the gate driver logic 402 de-asserts the gate pull high signal 502 (at time t5) and the gate pull low signal 504 remains de-asserted, which thus electrically floats the gate terminal 206 (from the perspective of the gate driver logic 402). In the example system, a short time later (here t6), the boost pull high signal 506 is asserted and the boost pull low 508 signal is de-asserted, thus coupling the internal supply voltage $V_{DD}$ to the capacitance terminal 212. Based on coupling the internal supply voltage $V_{DD}$ to the capacitance terminal 212, the gate voltage 514 again rises, thus implementing the boost function.

In example embodiments that do not attempt to implement clamping of the gate voltage, the boost pull high signal 506 and boost pull low signal 508 remain unchanged until the falling edge transition of the gate signal 500 at time t8. However, in the embodiments of FIG. 5 a gate clamping operation is described. In particular, at example time t7 the gate voltage 514 reaches the predefined clamp voltage ($V_C$ in the figure). When the gate voltage reaches the predefined clamp voltage, the voltage on the gate is clamped by floating the capacitance terminal 212. In particular, when the clamp enable signal 512 is asserted at time t7, the boost pull high signal 508 is de-asserted, which electrically floats the capacitance terminal 212, and since the gate terminal 206 was likewise electrically floated at time t5, the gate of the SR FET thus is electrically floated but remains high because the gate of a FET is separated from its active region by way of an insulator. Finally, at time t8 the gate signal 500 goes de-asserted, and correspondingly the gate pull low signal 504 is asserted (thus grounding the gate terminal 206 and making SR FET 122 non-conductive), the boost pull low signal 508 is asserted in anticipation of the next boost cycle, and the clamp enable signal 512 is de-asserted as soon as the gate voltage 514 again falls below the predefined clamp voltage.

Figure 6:
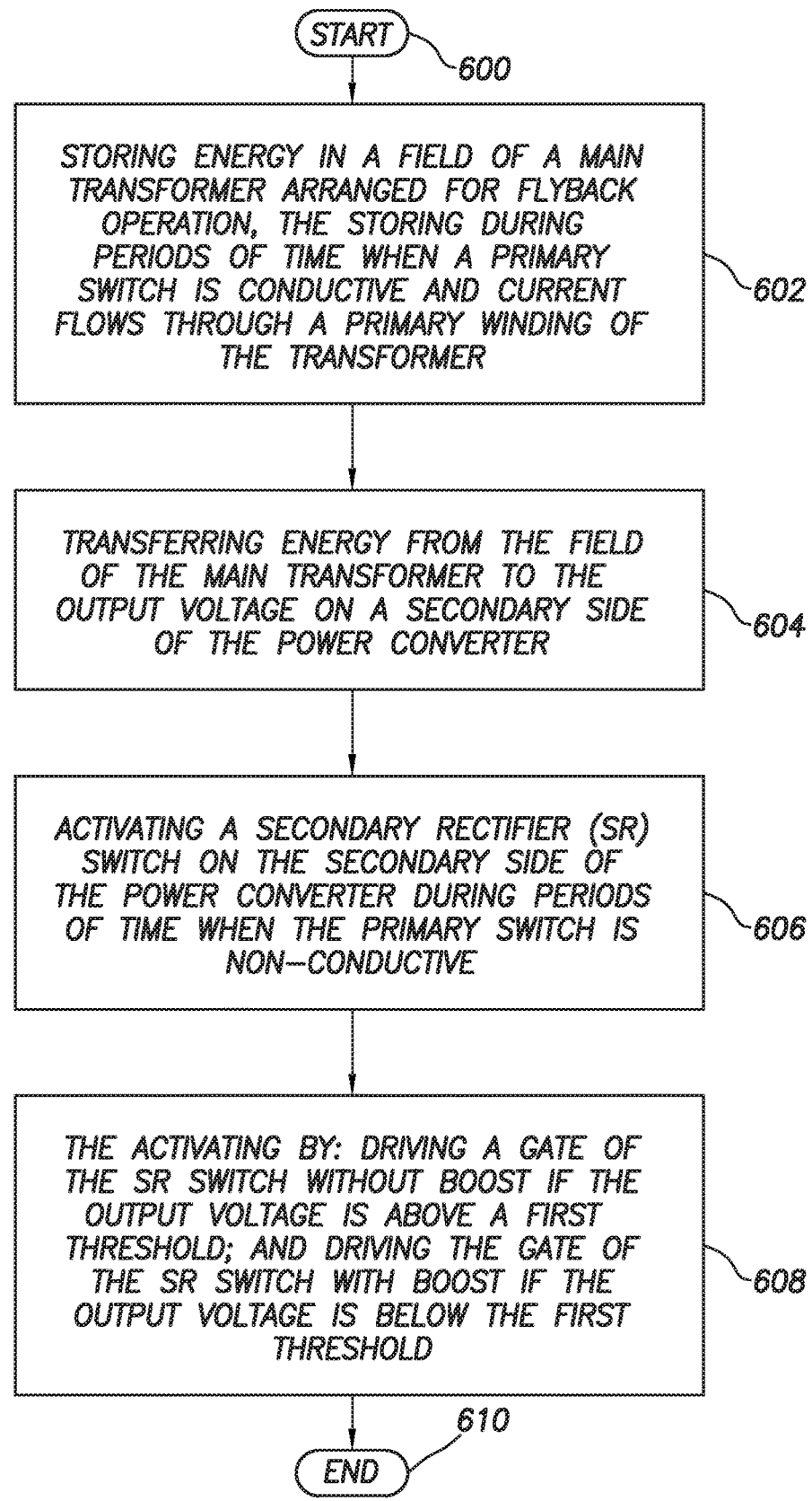
FIG. 6 shows a method in accordance with at least some embodiments.

FIG. 6 shows a method in accordance with at least some embodiments. In particular, the method starts (block 600) and includes: storing energy in a field of a main transformer arranged for flyback operation, the storing during periods of time when a primary switch is conductive and current flows through a primary winding of the transformer (block 602); transferring energy from the field of the main transformer to the output voltage on a secondary side of the power converter (block 604); activating a secondary rectifier (SR) switch on the secondary side of the power converter during period of time when the primary switch is non-conductive (block 606), the activating by driving a gate of the SR switch without boost if the output voltage is above a first threshold;
and driving the gate of the SR switch with boost if the output voltage is below the first threshold (block 608). Thereafter the method ends (block 610).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a power converter to create an output voltage, comprising: storing energy in a field of a main transformer arranged for flyback operation, the storing during periods of time when a primary switch is conductive and current flows through a primary winding of the main transformer and then transferring energy from the field of the main transformer to the output voltage on a secondary side of the power converter; activating a secondary rectifier (SR) switch on the secondary side of the power converter while transferring energy from the field of the main transformer to the output voltage, the activating by: determining whether the output voltage is below a first threshold; driving a gate of the SR switch with a first voltage; and then, if the output voltage is below the first threshold; and driving the gate of the SR switch with a second voltage, higher than the first voltage.

2. The method of claim 1, wherein driving the gate of the SR switch with the second voltage further comprises:
   charging a boost capacitor having a first lead coupled to the gate and a second lead grounded; and then
   floating the gate of the SR switch and coupling the second lead of the boost capacitor to a boost voltage.

3. The method of claim 2, further comprising clamping the voltage of the gate at predefined clamp voltage.

4. The method of claim 2, further comprising, after floating the gate of the SR switch:
   comparing a voltage on the gate of the SR switch to a predefined clamp voltage; and
   floating the second lead of the boost capacitor when the voltage of the gate meets or exceeds the predefined clamp voltage.

5. The method of claim 1, wherein driving the gate of the SR switch with the first voltage further comprises at least one selected from the group comprising: coupling a boost capacitor between the gate of the SR switch and ground; and floating the boost capacitor coupled to the gate of the SR switch.

6. A power converter comprising:
   a primary side comprising:
      a primary winding of a main transformer;
      a primary field effect transistor (FET) coupled to the primary winding, the primary FET having a gate;
   a secondary side comprising:
      a secondary winding of the main transformer, the primary winding and secondary winding arranged for flyback operation;
      a secondary rectifier (SR) FET coupled to the secondary winding, and the SR FET defining a gate;
      a secondary-side controller defining a gate terminal, a winding sense terminal, a voltage sense terminal, and a capacitance terminal, the gate terminal coupled to the gate of the SR FET, the winding sense terminal coupled to a node between the secondary winding and the SR FET, and the voltage sense terminal coupled to an output voltage of the power converter;

a capacitor defining a first lead coupled to the gate terminal and a second lead coupled to the capacitance terminal;

wherein the secondary-side controller is configured to sense, by way of the winding sense terminal, that the secondary winding is delivering power to a load, and responsive thereto:

sense the output voltage by way of the voltage sense terminal;

drive a gate voltage to the gate of the SR FET by way of the gate terminal; and then, if the output voltage is below a threshold voltage float the gate terminal and drive a boost voltage to the capacitance terminal.

7. The power converter of claim 6, wherein when the secondary-side controller drive the gate voltage to the gate of the SR FET, the secondary-side controller is further configured to ground the second lead of the capacitor.

8. The power converter of claim 7, wherein the secondary-side controller is further configured to, after the gate of the SR FET is floated, clamp the gate of the SR FET at a predefined clamp voltage.

9. The power converter of claim 7, wherein the secondary-side controller is further configured to, after the gate of the SR FET is floated:

compare a voltage on the gate of the SR FET to a predefined clamp voltage; and float the second lead of the capacitor when the voltage on the gate of the SR FET meets or exceeds the predefined clamp voltage.

10. The power converter of claim 6, wherein when the secondary-side controller drives the gate voltage to the gate of the SR FET, the secondary-side controller is further configured to at least one selected from the group comprising: ground the second lead of the capacitor; and float the second lead of the capacitor.

11. A power converter comprising:

a primary side comprising:
  a primary winding of a main transformer;
  a primary field effect transistor (FET) coupled to the primary winding, the primary FET having a gate;

a secondary side comprising:
  a secondary winding of the main transformer;
  a secondary rectifier (SR) FET coupled to the secondary winding, and the SR FET defining a gate;
  a secondary-side controller comprising:
    a gate terminal, a winding sense terminal, a voltage sense terminal, and a capacitance terminal, the gate terminal coupled to the gate of the SR FET, the winding sense terminal coupled to a node between the secondary winding and the SR FET, and the voltage sense terminal coupled to an output voltage of the power converter;
    a boost comparator defining a first input, a second input, and a boost enable output, the first input coupled to the voltage sense terminal, and the second input coupled to a reference voltage;
    a boost logic defining a boost enable input, a gate input, and a boost output, the boost enable input coupled to the boost enable output of the boost comparator, and the boost output coupled to the capacitance terminal;
    a gate driver logic defining a boost enable input, a gate input, and a gate output, the boost enable input of the gate driver logic coupled to the boost enable output of the boost comparator, and the gate output coupled to the gate terminal;

the boost logic configured to, during periods of time when the boost enable output is de-asserted, ground or float the second lead of the capacitor; and the gate driver logic configured to, during periods of time when the boost enable output is de-asserted, drive the gate of the SR FET to match the gate input;

a capacitor defining a first lead coupled to the gate terminal and a second lead coupled to the capacitance terminal;

wherein the secondary-side controller is configured to:

make the SR FET non-conductive during periods of time when the primary FET is conductive;

make the SR FET conductive during periods of time when the primary FET is non-conductive, by being configured to:

drive the gate of the SR FET without boost it the output voltage is above a first threshold; and drive the gate of the SR FET with boost if the output voltage is below the first threshold.

12. The power converter of claim 11:

wherein the gate driver logic is further configured to, during periods of time when the boost enable output is asserted and the gate input is asserted:

drive a voltage to the gate of the SR FET responsive to assertion of the gate input; and then float the gate of the SR FET;

wherein the boost logic is further configured to, during periods of time when the boost enable output is asserted:

ground the second lead of the capacitor responsive to assertion of the gate input; and when the gate of the SR FET is floated drive a boost voltage to the second lead of the capacitor.

13. The power converter of claim 12, wherein the secondary-side controller further comprises:

a clamp comparator defining a first input, a second input, and a clamp output, the first input of the clamp comparator coupled to the gate terminal, and the second input of the clamp comparator coupled to a clamp voltage;

the boost logic further comprises a clamp input coupled to the clamp output;

the boost logic is further configured to, during periods of time when the boost enable output is asserted and the gate of the SR FET driven high, float the second lead of the capacitor when the clamp output is asserted.

14. A secondary-side controller for a power converter, the secondary-side controller comprising:

a gate terminal, a winding sense terminal, a voltage sense terminal, and a capacitance terminal;

the secondary-side controller is configured to sense, by way of the winding sense terminal, status of a primary winding, and responsive to the status of the primary winding, the secondary-side controller is further configured to:

sense a voltage on the voltage sense terminal;

drive a gate voltage to the gate terminal; and then, if the voltage on the sense terminal is below a threshold voltage float the gate terminal and drive a boost voltage to capacitance terminal.

15. The secondary-side controller of claim 14, wherein when the second-side controller drives the gate voltage to the gate terminal, the secondary-side controller is further configured to ground the capacitance terminal.

16. The secondary-side controller of claim 15, wherein the secondary-side controller is further configured to, after the gate terminal is floated, clamp the gate terminal at a predefined clamp voltage.

17. A secondary-side controller for a power converter, the secondary-side controller comprising:
- a gate terminal, a winding sense terminal, a voltage sense terminal, and a capacitance terminal;
- the secondary-side controller is configured to sense, by way of the winding sense terminal, status of a primary winding, and responsive thereto:
  - if a voltage on the voltage sense terminal is above a first threshold, drive the gate terminal without boost by driving a voltage to the gate terminal while grounding the capacitance terminal, and then float the gate terminal and couple the capacitance terminal to a boost voltage; and
  - if the voltage on the voltage sense terminal is below the first threshold, drive the date terminal with boost by driving a voltage to the gate terminal while grounding the capacitance terminal, and then float the gate terminal and couple the capacitance terminal to a boost voltage;
- wherein the secondary-side controller is further configured to, after the gate terminal is floated:
  - compare a voltage on the gate terminal to a predefined clamp voltage; and
  - float the capacitance terminal when the voltage on the gate meets or exceeds the predefined clamp voltage.

18. A secondary-side controller for a power converter, the secondary-side controller comprising:
- a gate terminal, a winding sense terminal, a voltage sense terminal, and a capacitance terminal;
- a boost comparator defining a first input, a second input, and a boost enable output, the first input coupled to the voltage sense terminal, and the second input coupled to a reference voltage;
- a boost logic defining a boost enable input, a gate input, and boost output, the boost enable input coupled to the boost enable output of the boost comparator, and the boost output coupled to the capacitance terminal;
- a gate driver logic defining a boost enable input, a gate input, and a gate output, the boost enable input of the gate driver logic coupled to the boost enable output of the boost comparator, and the gate output coupled to the gate terminal;
- the boost logic configured to, during periods of time when the boost enable output is de-asserted, ground or float the capacitance terminal; and
- the gate driver logic configured to, during periods of time when the boost enable output is de-asserted, drive the gate terminal to match the gate input of the gate driver logic;
- the secondary-side controller is configured to sense, by way of the winding sense terminal, status of a primary winding, and responsive thereto:
  - drive the gate terminal without boost if a voltage on the voltage sense terminal is above a first threshold; and
  - drive the gate terminal with boost if the voltage on the voltage sense terminal is below the first threshold.

19. The secondary-side controller of claim 18:
- wherein the gate driver logic is further configured to, during periods of time when the boost enable output is asserted and the gate input of the gate driver logic is asserted:
  - drive a voltage to the gate terminal responsive to assertion of the gate input of the gate driver logic; and then
  - float the gate terminal;
- wherein the boost logic is further configured to, during periods of time when the boost enable output is asserted:
  - ground the capacitance terminal responsive to assertion of the gate input of the boost logic; and when the gate terminal is floated
  - drive a boost voltage to the capacitance terminal.

20. The secondary-side controller of claim 19, wherein the secondary-side controller further comprises:
- a clamp comparator defining a first input, a second input, and a clamp output, the first input of the clamp comparator coupled to the gate terminal, and the second input of the clamp comparator coupled to a clamp voltage;
- the boost logic further comprise a clamp input coupled to the clamp output;
- the boost logic is further configured to, during periods of time when the boost enable output is asserted, float the capacitance terminal when the clamp output is asserted.

* * * * *

UNITED STATES PATENT AND TRADEMARK OFFICE
CERTIFICATE OF CORRECTION

PATENT NO. : 10,516,341 B1
APPLICATION NO. : 16/223288
DATED : December 24, 2019
INVENTOR(S) : Jian Ming Fu, Chou-Sheng Wang and Zhibo Tao Page 1 of 1

It is certified that error appears in the above-identified patent and that said Letters Patent is hereby corrected as shown below:

In the Claims

Column 13,
Claim 17, Line 19, "date" should be --gate--

Signed and Sealed this
Third Day of March, 2020

Andrei Iancu
*Director of the United States Patent and Trademark Office*